United States Patent
Torii et al.

(10) Patent No.: US 10,224,808 B2
(45) Date of Patent: Mar. 5, 2019

(54) ELECTRIC POWER CONVERSION DEVICE WITH SNUBBER CIRCUIT

(71) Applicant: TOYOTA JIDOSHA KABUSHIKI KAISHA, Toyota-shi, Aichi-ken (JP)

(72) Inventors: Kaoru Torii, Toyota (JP); Kazunari Yamamoto, Toyota (JP); Kosuke Kaji, Toyota (JP); Taiki Kato, Nagoya (JP); Takashi Kojima, Nagakute (JP); Katsuya Nomura, Nagakute (JP); Yoshiyuki Hattori, Nagakute (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/634,516

(22) Filed: Jun. 27, 2017

(65) Prior Publication Data
US 2018/0006549 A1 Jan. 4, 2018

(30) Foreign Application Priority Data
Jun. 30, 2016 (JP) .................................. 2016-130452

(51) Int. Cl.
*H02M 1/34* (2007.01)
*H02M 1/14* (2006.01)
*H02M 3/156* (2006.01)

(52) U.S. Cl.
CPC ............. *H02M 1/34* (2013.01); *H02M 1/14* (2013.01); *H02M 3/156* (2013.01); *H02M 2001/348* (2013.01)

(58) Field of Classification Search
CPC ............. H02M 2001/348; H02M 1/34; H02M 2001/346; H02M 2001/344; H02M 2001/342; H02M 1/14
See application file for complete search history.

(56) References Cited

U.S. PATENT DOCUMENTS 5,373,195 A * 12/1994 De Doncker ......... B60L 11/005
307/45
5,959,438 A * 9/1999 Jovanovic ............... H02M 1/34
323/222

(Continued)

FOREIGN PATENT DOCUMENTS

DE 102004041206 A1 3/2006
JP 2012-231593 A 11/2012

(Continued)

OTHER PUBLICATIONS

Matthias Hampe, Alexander Stieler, Karl-Dieter Tieste, "Damping of High-Frequency Oscillations in Power Devices Using Optimized Snubber Circuits" IEEE Conferences, 2018 International Symposium on Electromagnetic Compatibility, Aug. 30, 2018, pp. 1-6. (Year: 2018).*

(Continued)

*Primary Examiner* — Harry R Behm
(74) *Attorney, Agent, or Firm* — Sughrue Mion, PLLC

(57) ABSTRACT

If the capacitance of a snubber capacitor, the inductance of a coil and the magnitude of a resistor are specified such that the resonance frequency of the snubber circuit coincides with the ringing frequency of the transistor, and the impedance of the first loop at the resonance frequency becomes smaller than the impedance of the second loop at the resonance frequency, a current component due to ringing flows in the snubber circuit, and energy is consumed by the resistor. Therefore, it is possible to quickly converge ringing.

3 Claims, 6 Drawing Sheets

(56) References Cited

U.S. PATENT DOCUMENTS

| | | | |
|---|---|---|---|
| 6,341,076 B1* | 1/2002 | Kadatskyy | H02M 1/34 363/56.09 |
| 2006/0244428 A1* | 11/2006 | Jitaru | H02M 1/34 323/222 |
| 2011/0090716 A1* | 4/2011 | Asuke | H02M 1/34 363/21.01 |
| 2014/0111176 A1 | 4/2014 | Nishimura | |
| 2016/0344279 A1 | 11/2016 | Kanda et al. | |
| 2017/0229953 A1 | 8/2017 | Otake | |

FOREIGN PATENT DOCUMENTS

| | | |
|---|---|---|
| JP | 201677102 A | 5/2016 |
| WO | 2015049736 A1 | 4/2015 |
| WO | 2016067835 A1 | 5/2016 |
| WO | 2016084136 A1 | 6/2016 |

OTHER PUBLICATIONS

Alberto Garcia-Caraveo, Angel Soto, Rafael Gonzalez, Pedro Sanchez, "Brief Review on snubber circuits", IEEE, 2010 20th International Conference on Electronics Communications and Computers, Feb. 2010, pp. 271-275. (Year: 2010).*

* cited by examiner

ELECTRIC POWER CONVERSION DEVICE WITH SNUBBER CIRCUIT

INCORPORATION BY REFERENCE

The disclosure of Japanese Patent Application No. 2016-130452 filed on Jun. 30, 2016 including the specification, drawings and abstract is incorporated herein by reference in its entirety.

BACKGROUND

1. Technical Field

A technique disclosed in this specification relates to an electric power conversion device in which a transistor for electric power conversion and a smoothing capacitor are connected in parallel.

2. Description of Related Art

In an electric power conversion device, such as a voltage converter or an inverter, a transistor (power transistor) for electric power conversion is connected between a positive electrode line and a negative electrode line which transmit direct-current electric power, and a smoothing capacitor is further connected between the positive electrode line and the negative electrode line. The smoothing capacitor is provided to suppress ripples (voltage/current impulse) which occur due to repetition of on and off of the transistor.

In recent years, with improvement of a switching speed of a transistor, suppression of a surge voltage at the time of switching of the transistor becomes an issue. For example, in an electric power conversion device disclosed in Japanese Unexamined Patent Application Publication No. 2012-231593 (JP 2012-231593 A), in order to suppress a surge voltage, a snubber circuit constituted by series connection of another capacitor and a coil (inductor element) is added in parallel with a smoothing capacitor. In the electric power conversion device of JP 2012-231593 A, a loop of the smoothing capacitor, another capacitor, and the coil constitute a so-called LC resonance circuit. According to JP 2012-231593 A, at least one of the capacitance of the two capacitors or the inductance of the coil is regulated such that a resonance frequency of the LC resonance circuit becomes a predetermined frequency to be suppressed among frequency components included in a surge voltage.

SUMMARY

If the rising of the surge voltage is large, a vibration phenomenon of a voltage/current immediately after switching occurs. Such a vibration phenomenon is referred to as ringing. The technique of JP 2012-231593 A focuses on suppression of a surge voltage, not on ringing suppression. This specification provides an electric power conversion device capable of effectively suppressing ringing.

An aspect of the disclosure is an electric power conversion device. The electric power conversion device includes a transistor for electric power conversion, a diode, a smoothing capacitor, and a snubber circuit. The diode is connected in series with the transistor. The smoothing capacitor is connected in parallel with the transistor and the diode. The smoothing capacitor is configured to suppress ripples generated in the transistor. The snubber circuit includes a snubber capacitor, an inductor element, and a resistor. the snubber capacitor, the inductor element and the resistor is connected to each other in series. The snubber circuit is connected in parallel with the smoothing capacitor. The capacitance of the snubber capacitor, the inductance of the inductor element and the magnitude of the resistor are set such that a resonance frequency of the snubber circuit coincides with a ringing frequency of the transistor, and is set such that the impedance of a first loop at the resonance frequency becomes smaller than the impedance of a second loop at the resonance frequency. The first loop includes the snubber circuit and the smoothing capacitor. The second loop includes the transistor and the smoothing capacitor.

If the impedance of the first loop at the resonance frequency is smaller than the impedance of the second loop at the resonance frequency, a current component having the same frequency as the resonance frequency flows in the first loop more easily than the second loop. That is, according to the above-described configuration, if the capacitance of the snubber capacitor, the inductance of the inductor element and the magnitude of the resistor are specified such that the resonance frequency of the snubber circuit coincides with the ringing frequency of the transistor, and the impedance of the first loop at the resonance frequency becomes smaller than the impedance of the second loop at the resonance frequency, a current component due to ringing flows in the snubber circuit, and energy is consumed by the resistor. That is, it is possible to quickly converge ringing.

In the electric power conversion device, the capacitance of the snubber capacitor may be set so as to become equal to the inter-terminal capacitance of the transistor. The inductance of the inductor element may be set such that the inductance of the first loop becomes equal to the inductance of the second loop. The magnitude of the resistor may be set such that the impedance of the first loop at the resonance frequency becomes smaller than the impedance of the second loop at the resonance frequency. With the above-described configuration, if the capacitance of the snubber capacitor is set so as to become equal to the inter-terminal capacitance of the transistor, the inductance of the inductor element is set such that the inductance of the first loop becomes equal to the inductance of the second loop, the resonance frequency of the snubber circuit coincides with the ringing frequency. At the resonance frequency, contribution to the capacitor capacitance and the impedance of the inductance theoretically becomes zero. That is, the impedance at the resonance frequency of the snubber circuit constituted by series connection of the resistor, the capacitor, and the inductor element is specified only by the magnitude of the resistor. For this reason, if the capacitance of the snubber capacitor and the inductance of the inductor element are set as described above, the impedance of the first loop at the ringing frequency can be regulated only by the magnitude of the resistor. That is, the capacitance of the snubber capacitor, the inductance of the inductor element, and the magnitude of the resistor can be set individually, and respective elements for passing current vibration components due to ringing through the snubber circuit are easily selected. With this setting, since the capacitance of the snubber capacitor, the inductance of the inductor element, and the magnitude of the resistor included in the snubber circuit can be specified individually, it is possible to easily realize an electric power conversion device with a snubber circuit which suppresses ringing.

In the electric power conversion device, the snubber circuit may be accommodated in a capacitor unit. The capacitor unit may accommodate the smoothing capacitor.

With the above-described configuration, it is not necessary to provide a space for a snubber circuit other than the capacitor unit.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
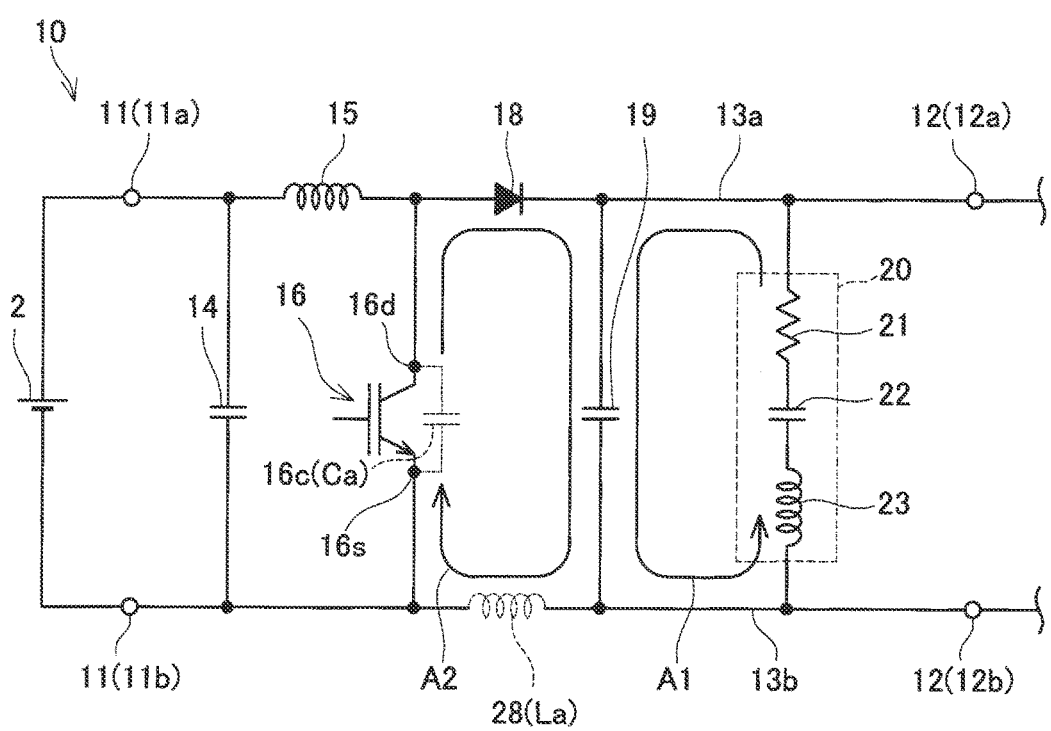
FIG. 1 is a block diagram of an electric power conversion device of a first example.

An electric power conversion device of a first example will be described referring to FIGS. 1 to 4. FIG. 1 is a block diagram of the electric power conversion device of the first example. The electric power conversion device of the first example is a boost converter 10 which boosts the electric power of a direct-current power supply 2 connected to an input end 11 and outputs electric power to an output end 12.

The circuit structure of the boost converter 10 will be described. The boost converter 10 is provided with a filter capacitor 14, a reactor 15, a transistor 16, an anti-backflow diode 18, a smoothing capacitor 19, and a snubber circuit 20. The transistor 16 is a power transistor for electric power conversion. The transistor 16 is formed with a substrate of silicon carbide (SiC) or gallium nitride (GaN), and has a fast switching speed.

The filter capacitor 14 is connected between an input end positive electrode 11a and an input end negative electrode 11b of the boost converter 10. The reactor 15 has a first end connected to the input end positive electrode 11a and a second end connected to a drain electrode 16d of the transistor 16. The drain electrode 16d is also connected to an output end positive electrode 12a through the anti-backflow diode 18. The anti-backflow diode 18 has an anode connected to the drain electrode 16d and a cathode connected to the output end positive electrode 12a. A source electrode 16s of the transistor 16 is connected to the input end negative electrode 11b. The source electrode 16s of the transistor 16 is connected to an output end negative electrode 12b through a coil 28 (described below). In other words, the transistor 16 is connected between an electric power positive electrode line 13a and an electric power negative electrode line 13b to which the electric power of the direct-current power supply 2 is transmitted.

The anti-backflow diode 18 is connected in series with the transistor 16. The smoothing capacitor 19 is connected in parallel with the series connection of the transistor 16 and the anti-backflow diode 18.

The snubber circuit 20 is constituted by series connection of a resistor 21, a snubber capacitor 22, and a coil 23, and the series connection is connected in parallel with the smoothing capacitor 19. In other words, like the transistor 16 or the smoothing capacitor 19, the snubber circuit 20 is connected between the electric power positive electrode line 13a and the electric power negative electrode line 13b.

The coil 28 indicated by a broken line in FIG. 1 represents parasitic inductance which occurs in a loop constituted of the transistor 16 and the smoothing capacitor 19, and a capacitor 16c indicated by a broken line represents inter-terminal capacitance (parasitic capacitance) which occurs between the drain electrode 16d and the source electrode 16s of the transistor 16. Hereinafter, parasitic inductance which occurs in the loop constituted of the transistor 16 and the smoothing capacitor 19 is represented by a symbol La, and the inter-terminal capacitance of the transistor 16 is represented by a symbol Ca. The parasitic inductance La is in a range of several [nH] to several tens of [nH], and the inter-terminal capacitance Ca is several hundreds of [pF].

The transistor 16 of the boost converter 10 is repeatedly switched on and off in response to a drive signal having a given duty ratio sent from a gate driver (not shown), and boosts direct-current electric power applied to the input end 11. The circuit configuration (excluding the snubber circuit 20) of the boost converter 10 shown in FIG. 1 is well-known, and thus, detailed description of the operation will be omitted.

The filter capacitor 14 and the smoothing capacitor 19 are provided in order to suppress ripples occurring in direct-current electric power. Ripples are voltage/current impulse which occurs due to repetition of switching of the transistor 16, and a frequency thereof depends on a frequency of a carrier for determining the timing of switching of the transistor 16. The carrier frequency of the transistor 16 is substantially in a range of several [kHz] to several tens of [kHz]. Accordingly, a frequency bandwidth of ripples becomes a range of several [kHz] to several tens of [kHz]. The capacitance of the filter capacitor 14 or the smoothing capacitor 19 for suppressing ripples in this bandwidth is set in a range of several tens of [μF] to several hundreds of [μF].

In a fast power transistor using silicon carbide (SiC) or gallium nitride (GaN), voltage/current vibration generated in a drain electrode or a source electrode immediately after switching from on to off and immediately after switching from off to on increases. The voltage/current vibration generated immediately after switching from on to off and immediately after switching from off to on is referred to as ringing. The capacitance Cs of the snubber capacitor 22, the magnitude Rs of the resistor 21, and the inductance Ls of the coil 23 of the snubber circuit 20 are set so as to suppress ringing.

Next, settings of the capacitance Cs of the snubber capacitor 22, the magnitude Rs of the resistor 21, and the inductance of the coil 23 of the snubber circuit 20 will be described. The inductance of the loop (the loop indicated by reference numeral A1 in FIG. 1) of the smoothing capacitor 19 and the snubber circuit 20 including the inductance of the coil 23 is represented by the symbol Ls. The frequency bandwidth of ringing depends on the inter-terminal capacitance Ca of the transistor 16 and parasitic inductance La of the loop (the loop indicated by reference numeral A2 in FIG. 1) of the transistor 16 and the smoothing capacitor 19. Specifically, the ringing frequency Fa can be approximated by Expression (1).

$$Fa = \frac{1}{2\pi\sqrt{La \cdot Ca}} \quad (1)$$

While the smoothing capacitor 19 is present in the loop of the transistor 16 and the smoothing capacitor 19, the capacitance Cm of the smoothing capacitor 19 does not appear in Expression (1). This is because the frequency bandwidth of ringing is in a range of several [MHz] to several tens of [MHz] and is 1000 times greater than the frequency bandwidth (several [kHz] to several tens of [kHz]) of ripples. That is, in a case of approximating the ringing frequency Fa, the capacitance of the smoothing capacitor 19 for suppressing ripples is negligible. Incidentally, the inter-terminal capacitance Ca is in a range of several hundreds of [pF] to several [nF] and is equal to or less than one thousandth of the capacitance (several [μF] to several hundreds of [μF]) of the smoothing capacitor 19.

Hereinafter, for convenience of description, the loop (the loop of the smoothing capacitor 19 and the snubber circuit 20) indicated by reference numeral A1 in FIG. 1 is referred to as a first loop, and the loop (the loop of the transistor 16 and the smoothing capacitor 19) indicated by reference numeral A2 is referred to as a second loop.

A resonance frequency Fs of the first loop (the loop A1 of FIG. 1) constituted of the smoothing capacitor 19 and the snubber circuit 20 can be represented by Expression (2).

$$Fs = \frac{1}{2\pi\sqrt{Ls \cdot Cs}} \quad (2)$$

As described above, in Expression (2), the symbol Cs represents the capacitance of the snubber capacitor 22, and the symbol Ls represents the inductance of the first loop constituted of the smoothing capacitor 19 and the snubber circuit 20 including the inductance of the coil 23. In making the ringing frequency Fa shown in Expression (1) coincide with the resonance frequency Fs of the snubber circuit 20 shown in Expression (2), the capacitance Cs and the inductance of the coil 23 may be regulated such that the product [Cs·Ls] of the capacitance Cs of the snubber capacitor 22 and the inductance Ls of the first loop becomes equal to the product [Ca·La] of the inter-terminal capacitance Ca and the parasitic inductance La (the inductance of the second loop). Simply, the capacitance Cs of the snubber capacitor 22 may be set to a value equal to the inter-terminal capacitance Ca, and the inductance of the coil 23 may be set such that the inductance Ls of the first loop becomes equal to the inductance La of the second loop. Conversely, the capacitance Cs of the snubber capacitor 22 is set to a value equal to the inter-terminal capacitance Ca, and the inductance of the coil 23 is set such that the inductance Ls of the first loop becomes equal to the inductance La of the second loop, whereby it is possible to make the resonance frequency Fs of the snubber circuit coincide with the ringing frequency Fa. The capacitance Ca of the snubber capacitor 22 becomes equal to the inter-terminal capacitance in a range of several hundreds of [pF] to several [nF], and as a result, becomes equal to or less than one thousandth of the capacitance (several tens of [μF] to several hundreds of [μF]) of the smoothing capacitor 19 described above.

In making the product [Cs·Ls] coincide with the product [Ca·La], the capacitance Cs and the inductance Ls may have a given relationship. However, in this example, the capacitance Cs of the snubber capacitor 22 is made to coincide with the parasitic capacitance Ca, and the inductance Ls of the first loop is made to coincide with the inductance La of the second loop. An advantage of this setting will be described below.

Next, setting of the magnitude (resistance value Rs) of the resistor 21 of the snubber circuit 20 will be described. The frequency characteristic of impedance Z1 of the first loop of the smoothing capacitor 19 and the snubber circuit 20 can be represented by Expression (3).

$$Z1 = Rs + j\left(\omega \cdot Ls - \frac{1}{\omega \cdot Cs}\right) \quad (3)$$

At the resonance frequency Fs, the term in the parentheses on the right side of Expression (3) is zero. Accordingly, the impedance Z1 at the resonance frequency Fs is specified by the resistance value Rs of the resistor 21. In other words, the capacitance Cs of the snubber capacitor 22 and the inductance Ls of the first loop do not affect the impedance Z1 at the resonance frequency Fs. Hereinafter, the impedance of the first loop at the resonance frequency is represented by a symbol Zs.

Figure 2:
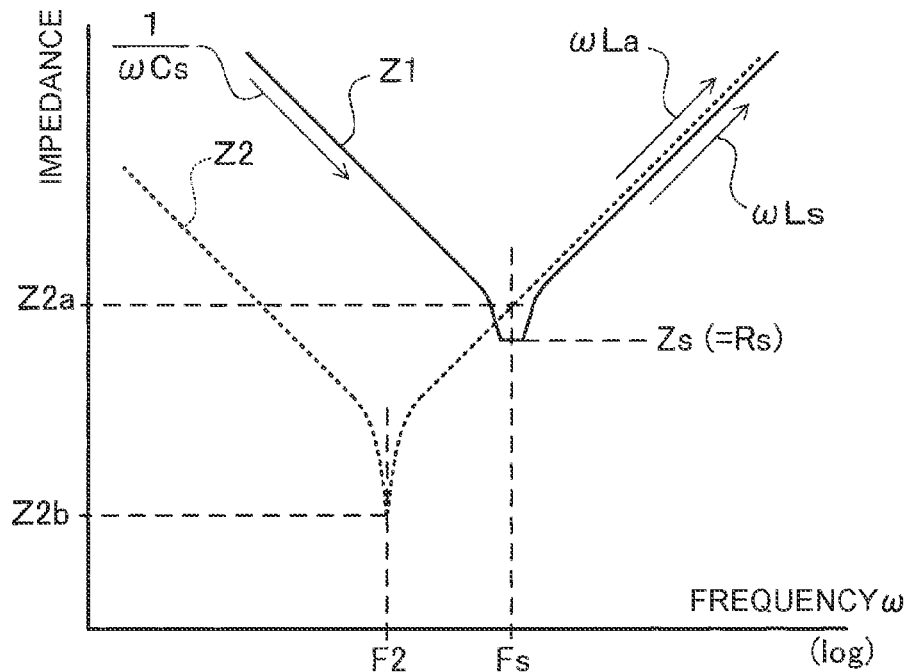
FIG. 2 is a graph showing an example of a frequency characteristic of impedance of a loop of a smoothing capacitor and impedance of a loop of a snubber circuit.

FIG. 2 shows examples of the frequency characteristic of the impedance Z1 of the first loop of the snubber circuit 20 and the smoothing capacitor 19 and the frequency characteristic of impedance Z2 of the second loop of the transistor 16 and the smoothing capacitor 19. As shown in FIG. 2, the resistance value Rs is set such that the impedance Zs of the first loop of the snubber circuit 20 and the smoothing capacitor 19 at the resonance frequency Fs becomes smaller than the impedance Z2a of the second loop of the smoothing capacitor 19 and the transistor 16 at the resonance frequency Fs. In this manner, a current vibration component (frequency Fa=Fs) of ringing generated in the transistor 16 easily flows in the first loop (that is, the loop constituted of the snubber circuit 20 and the smoothing capacitor 19) having impedance lower than that of the second loop. As a result, a current vibration component of ringing generated in the transistor 16 circulates around the first loop constituted of the snubber circuit 20 and the smoothing capacitor 19, and is attenuated by the resistor 21 for each circulation.

The capacitance Cs of the snubber capacitor 22, the resistance value Rs of the resistor 21, and the inductance of the coil 23 are set as described above, whereby it is possible to effectively suppress ringing generated in the transistor 16. In particular, it is possible to specify the capacitance Cs corresponding to the inter-terminal capacitance Ca of the transistor 16, and to specify the inductance of the coil 23 corresponding to the inductance La of the second loop. The resistance value Rs can be specified corresponding to the impedance at the resonance frequency Fs. That is, it is possible to individually specify the capacitance Cs of the snubber circuit 20, the inductance of the coil 23, and the resistance value Rs. With the employment of the technique of the example, it is possible to easily realize an electric power conversion device with a snubber circuit which effectively suppresses ringing.

The inductance of the inductor element is regulated such that the inductance Ls of the first loop constituted of the snubber circuit 20 and the smoothing capacitor 19 becomes equal to the inductance La of the second loop constituted of the transistor 16 and the smoothing capacitor 19, whereby the following advantage is obtained. The inductance Ls of the first loop corresponding to the inclination of the impedance characteristic of the first loop on a frequency side higher than the resonance frequency. The inductance La of the second loop corresponds to the inclination of the impedance characteristic of the second loop on a frequency side higher than the resonance frequency. When the inductance La becomes equal to the inductance Ls, as shown in FIG. 2, this means that the graphs of the impedance characteristics of the first loop and the second loop are parallel to each other on a frequency side higher than the resonance frequency Fs. Accordingly, if the resistance value Rs is specified such that the impedance Zs of the first loop becomes lower than the impedance Z2a of the second loop by a predetermined difference or more at the resonance frequency Fs, this guarantees that the impedance of the first loop becomes lower than the impedance of the second loop in a frequency bandwidth higher than the resonance frequency Fs. In this case, a current vibration component of ringing at a frequency higher than the resonance frequency Fs also easily flows in the snubber circuit 20. It is possible to suppress not only a current vibration component of ringing at a principal frequency but also a current vibration component at a high frequency. The resistance value Rs is specified such that the impedance Zs of the first loop becomes lower than the impedance Z2a of the second loop by a predetermined difference or more, whereby the following effect can also be expected. Even if the actual impedance characteristics of the first loop and the second loop deviate slightly from impedance characteristics in terms of calculation, there is less possibility that the impedance of the first loop becomes higher than the impedance of the second loop on a frequency side higher than the resonance frequency Fs. Accordingly, a noise component having a frequency higher than the resonance frequency Fs (=ringing frequency Fa) is reliably directed to the snubber circuit 20, whereby a noise reduction effect of the snubber circuit 20 can be expected.

Since the impedance of the first loop at the resonance frequency Fs is specified only by the resistance value Rs, as shown in FIG. 2, an impedance curve of the first loop near the resonance frequency Fs becomes flat. This means that, even if the actual ringing frequency Fa and the actual resonance frequency Fs deviate slightly, the snubber circuit 20 can maintain a high attenuation characteristic with respect to ringing.

The capacitance Cs of the snubber capacitor 22, the resistance value Rs of the resistor 21, and the inductance of the coil 23 are regulated as described above, whereby the following effect can also be expected. If the capacitance Cs of the snubber capacitor 22 is set to the value equal to the inter-terminal capacitance Ca, and the inductance of the coil 23 is set such that the inductance Ls of the first loop becomes equal to the inductance La of the second loop, the design of the snubber circuit 20 for suppressing ringing is facilitated. That is, in the design of the boost converter 10, the capacitance Cs of the snubber capacitor 22 can be set according to the inter-terminal capacitance Ca of the transistor 16. In other words, the snubber capacitor 22 can be selected according to the inter-terminal capacitance Ca of the transistor 16. In the design of the boost converter 10, the inductance of the coil 23 of the snubber circuit 20 can be set according to the design of a conductor (bus bar) which connects the transistor 16 and the smoothing capacitor 19. In other words, the coil 23 of the snubber circuit 20 can be selected according to the design of the conductor (bus bar) which connects the transistor 16 and the smoothing capacitor 19.

Figure 3:
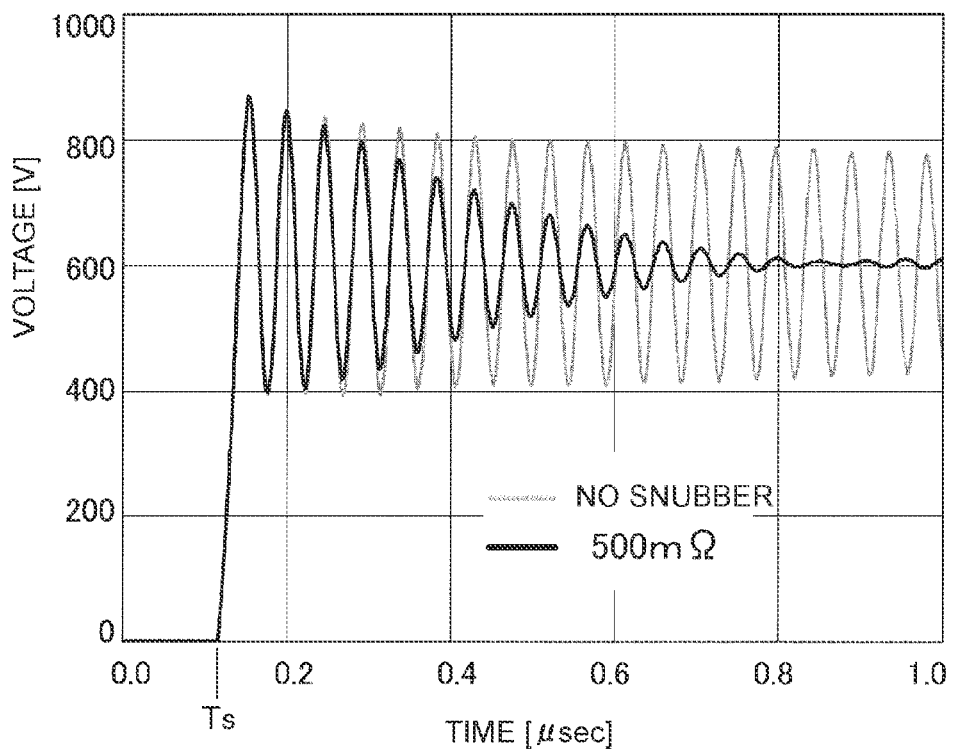
FIG. 3 shows an example of a simulation result for confirming the effects of the snubber circuit.

Next, a simulation result for confirming the effect of the snubber circuit 20 will be described. FIG. 3 is a graph of a simulation result of the circuit of FIG. 1. FIG. 3 shows a time response waveform of an output voltage when the transistor 16 is changed from on to off at a time Ts. A black line indicates a time response in a case where a snubber circuit is provided, and a gray line indicates a time response in a case where no snubber circuit is provided. Used parameters are as follows: an output voltage (a voltage after boost)=600 [V], the inter-terminal capacitance Ca of the transistor 16=1 [nF], the inductance La of the loop (second loop) of the transistor 16 and the smoothing capacitor 19=50 [nH], the capacitance Cm of the smoothing capacitor 19=355 [µF], the capacitance Cs of the snubber capacitor 22=1 [nF], the resistance value Rs of the resistor 21=500 [mΩ], and the inductance Ls of the loop (first loop) constituted of the snubber circuit 20 and the smoothing capacitor 19=50 [nH]. The inductance Ls includes the inductance of the coil 23 and parasitic inductance occurring in a conductor constituting the first loop. A conditions used in the simulation is [the capacitance Cs of the snubber capacitor 22]=[the inter-terminal capacitance Ca of the transistor 16]=1 [nF]. Furthermore, [the inductance Ls of the first loop]=[the inductance La of the second loop]=50 [nH]. The resistance value Rs of the resistor 21=500 [mΩ] corresponds to Zs in the graph of FIG. 2. As shown in FIG. 3, with the employment of the snubber circuit 20, the current vibration components due to ringing are attenuated quickly.

Figure 4:
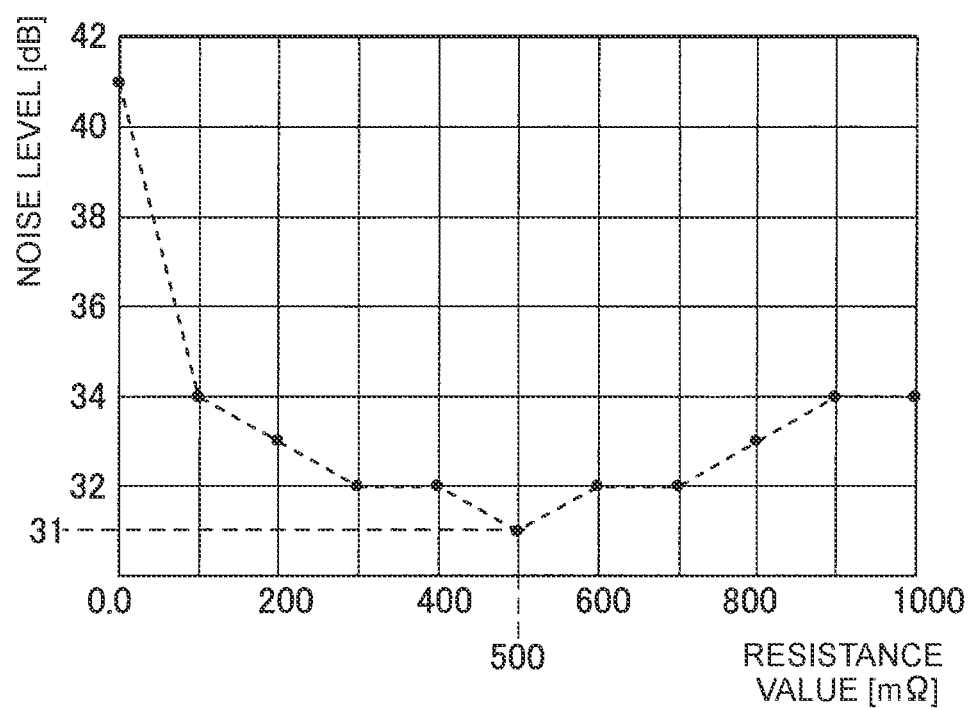
FIG. 4 shows an example of a simulation result for confirming a noise reduction effect when the magnitude of a resistor of the snubber circuit is changed.

Next, a simulation result for examining the influence of the resistance value Rs will be described. FIG. 4 is a graph in which the magnitude of a noise level when the resistance value Rs is changed is plotted. FIG. 4 shows the magnitude of a level (noise level) at a ringing frequency through frequency conversion of a time response when the transistor 16 is switched on and off. As shown in FIG. 4, when the resistance value Rs=500 [mΩ], the noise level becomes minimum. At this time, the noise level is lowered no less than 10 [dB] compared to a case where the snubber circuit 20 is not used (in a case where Rs=0).

If the resistance value Rs is excessively large, as described referring to FIG. 2, the amount of a current flowing in the first loop of the snubber circuit 20 out of the current vibration component due to ringing becomes larger than the amount of a current flowing in the second loop of the smoothing capacitor 19 and the transistor 16 out of the current vibration component due to ringing, and the noise level increases. If the resistance value Rs is excessively small, the attenuation effect is lowered. As described above, the resistance value Rs is set such that the impedance Zs at the resonance frequency Fs of the first loop of the snubber circuit 20 and the smoothing capacitor 19 becomes smaller than the impedance Z2a at the resonance frequency Fs of the second loop of the transistor 16 and the smoothing capacitor 19.

In the example of FIG. 2, the resistance value Rs is specified such that the impedance Zs of the first loop becomes lower than the impedance Z2a of the second loop by a predetermined difference or more. As long as the resistance value Rs is set such that the impedance Zs of the first loop at the resonance frequency Fs becomes smaller than the impedance Z2a of the second loop at the resonance frequency Fs, the above-described condition may not be satisfied. That is, the in the graph of FIG. 2, if a solid line is below a dotted line at the resonance frequency Fs, the dotted line may be positioned below the solid line in a frequency bandwidth higher than the resonance frequency Fs.

In the above-described example, the capacitance Cs of the snubber capacitor 22 is set so as to become equal to the inter-terminal capacitance Ca of the transistor 16, and the inductance of the coil 23 is set such that the inductance of the first loop becomes equal to the inductance of the second loop. Even if such conditions are not satisfied, the capacitance Cs, the inductance of the coil 23, and the resistance value Rs may satisfy the following conditions. That is, the capacitance Cs, the inductance of the coil 23, and the resistance value Rs may be set such that the resonance frequency Fs of the snubber circuit 20 coincides with the ringing frequency Fa of the transistor 16, and the impedance of the first loop at the resonance frequency Fs becomes smaller than the impedance of the second loop at the resonance frequency Fs. Specifically, the product [Cs·Ls] of the capacitance Cs of the snubber capacitor 22 and the inductance Ls of the first loop may coincide with the product [Ca·La] of the inter-terminal capacitance Ca of the transistor 16 and the parasitic inductance La of the second loop. Then, the resistance value Rs may be set such that the impedance of the first loop at the resonance frequency Fs becomes smaller than the impedance of the second loop at the resonance frequency Fs. In this case, it is advantageous in that a degree of freedom of setting the capacitance Cs of the snubber capacitor 22 and the inductance of the coil 23 is obtained.

Figure 5:
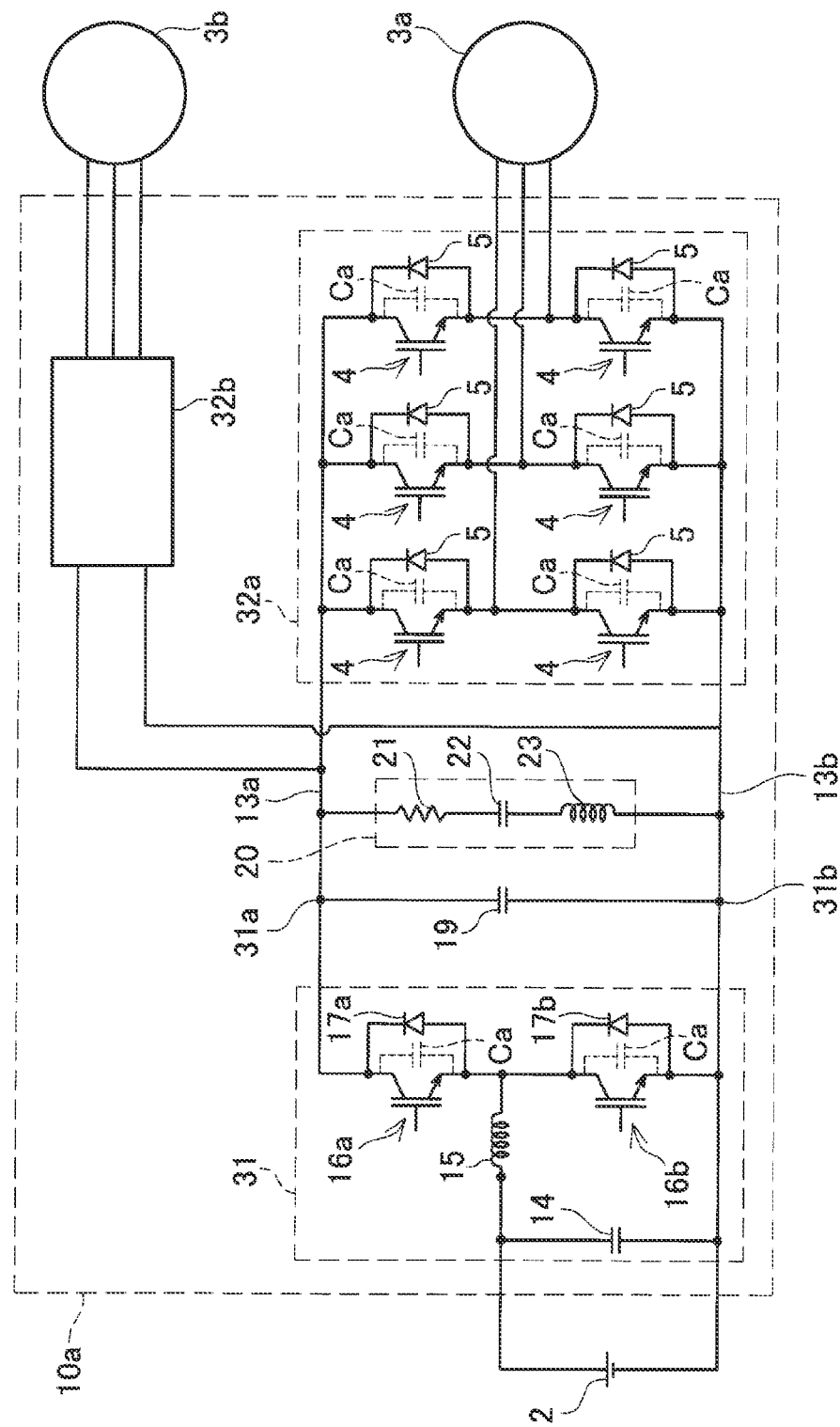
FIG. 5 is a block diagram of an electric power conversion device of a second example.

An electric power conversion device of a second example will be described referring to FIGS. 5 to 7. FIG. 5 is a block diagram of an electric power conversion device 10a of the second example. The electric power conversion device 10a is a device which boosts the electric power of the direct-current power supply 2, converts electric power to alternating-current electric power, and supplies three-phase alternating-current electric power to two motors 3a, 3b. The electric power conversion device 10a is mounted in an electric vehicle, and the two motors 3a, 3b are motors for traveling. The motors 3a, 3b also function as power generators.

The electric power conversion device 10a includes a bidirectional DC-DC converter 31 and two inverters 32a, 32b. The bidirectional DC-DC converter 31 can perform a boost operation to boost a voltage of the direct-current power supply 2 and to supply the voltage to the inverters 32a, 32b, and a deboost operation to deboost regenerative electric power sent from the inverters 32a, 32b and to supply the regenerative electric power to the direct-current power supply 2. The regenerative electric power is electric power generated by the motors 3a, 3b. The inverters 32a, 32b can convert alternating-current electric power generated by the motors 3a, 3b to direct-current electric power and can supply the direct-current electric power to the bidirectional DC-DC converter 31.

The bidirectional DC-DC converter 31 is provided with a filter capacitor 14, a reactor 15, two transistors 16a, 16b, and reflux diodes 17a, 17b. The two transistors 16a, 16b are connected in series, and the reflux diodes 17a, 17b are connected in reversely parallel with the transistors 16a, 16b, respectively. The high potential-side transistor 16a and the low potential-side reflux diode 17b primarily involve in the deboost operation, and the low potential-side transistor 16b and the high potential-side reflux diode 17a primarily involve in the boost operation. The circuit configuration and operation of the bidirectional DC-DC converter 31 of FIG. 5 are well-known, and thus, further description will be omitted.

The smoothing capacitor 19 is connected to high voltage ends 31a, 31b of the bidirectional DC-DC converter 31. In other words, the smoothing capacitor 19 is connected in parallel with the series connection of the transistors 16a, 16b. Focusing on the transistor 16a and the reflux diode 17b, it can be expressed that the smoothing capacitor 19 is connected in parallel with series connection of the transistor 16a and the reflux diode 17b. Focusing on the transistor 16b and the reflux diode 17a, it can be expressed that the smoothing capacitor 19 is connected in parallel with series connection of the transistor 16b and the reflux diode 17a. The snubber circuit 20 is connected in parallel with the smoothing capacitor 19. The snubber circuit 20 is constituted by series connection of the resistor 21, the snubber capacitor 22, and the coil 23. The snubber circuit 20 of the FIG. 5 is the same as the snubber circuit 20 shown in FIG. 1.

The inverters 32a, 32b are connected to the high voltage ends 31a, 31b of the bidirectional DC-DC converter 31. The inverter 32a is provided with three sets of series connections of two transistors 4. A reflux diode 5 is connected in reversely parallel with each transistor 4. The three sets of series connections are connected in parallel between the electric power positive electrode line 13a and the electric power negative electrode line 13b. An alternating current is output from the midpoint of each series connection. The circuit configuration of the inverter 32b is the same as the circuit configuration of the inverter 32a, and thus, in FIG. 5, the circuit configuration of the inverter 32b is not shown.

All of the transistors 16a, 16b of the bidirectional DC-DC converter 31 and a plurality of transistors 4 of the inverters 32a, 32b are power transistors for for electric power conversion, and are formed with a substrate of silicon carbide (SiC) or gallium nitride (GaN) as a base. Such transistors have a fast switching speed, and like the transistor 16 of the first example, has large ringing (voltage/current vibration after switching). As described below, the snubber circuit 20 can suppress ringing of all of the transistors 16a, 16b, 4 of the electric power conversion device 10a.

As shown in FIG. 5, all of the transistors 16a, 16b of the bidirectional DC-DC converter 31 and the transistors 4 of the inverters 32a, 32b are connected in parallel with the smoothing capacitor 19 and the snubber circuit 20.

In the electric power conversion device 10a, all transistors have the same characteristics, and have the same inter-terminal capacitance Ca. In the electric power conversion device 10a, a conductor which connects each transistor and the smoothing capacitor 19 is regulated such that the inductance of a loop (second loop) constituted of each transistor and the smoothing capacitor 19 becomes identical. For this reason, the ringing frequency becomes identical in all transistors. The capacitance of the snubber capacitor 22 is set so as to become equal to the inter-terminal capacitance of the transistor. The inductance of the coil 23 may be regulated such that the inductance of a loop (first loop) constituted of the snubber circuit 20 and the smoothing capacitor 19 becomes equal to the inductance of the loop (second loop) constituted of each transistor and the smoothing capacitor. For this reason, as in the first example, the resonance frequency of the snubber circuit 20 coincides with the ringing frequency of the transistor. The magnitude of the resistor 21 is regulated such that the impedance at the resonance frequency Fs of the loop (first loop) of the snubber circuit 20 and the smoothing capacitor 19 becomes smaller than the impedance at the resonance frequency Fs of the loop (second loop) of the smoothing capacitor 19 and each transistor. Since the respective elements of the snubber circuit 20 are set as described above, the snubber circuit 20 can suppress righting of all transistors. In the electric power conversion device 10a of FIG. 5, like the boost converter 10 of the first example, the capacitance of the snubber capacitor 22, the inductance of the coil 23, and the magnitude of the resistor 21 of the snubber circuit 20 can be individually specified.

Figure 6:
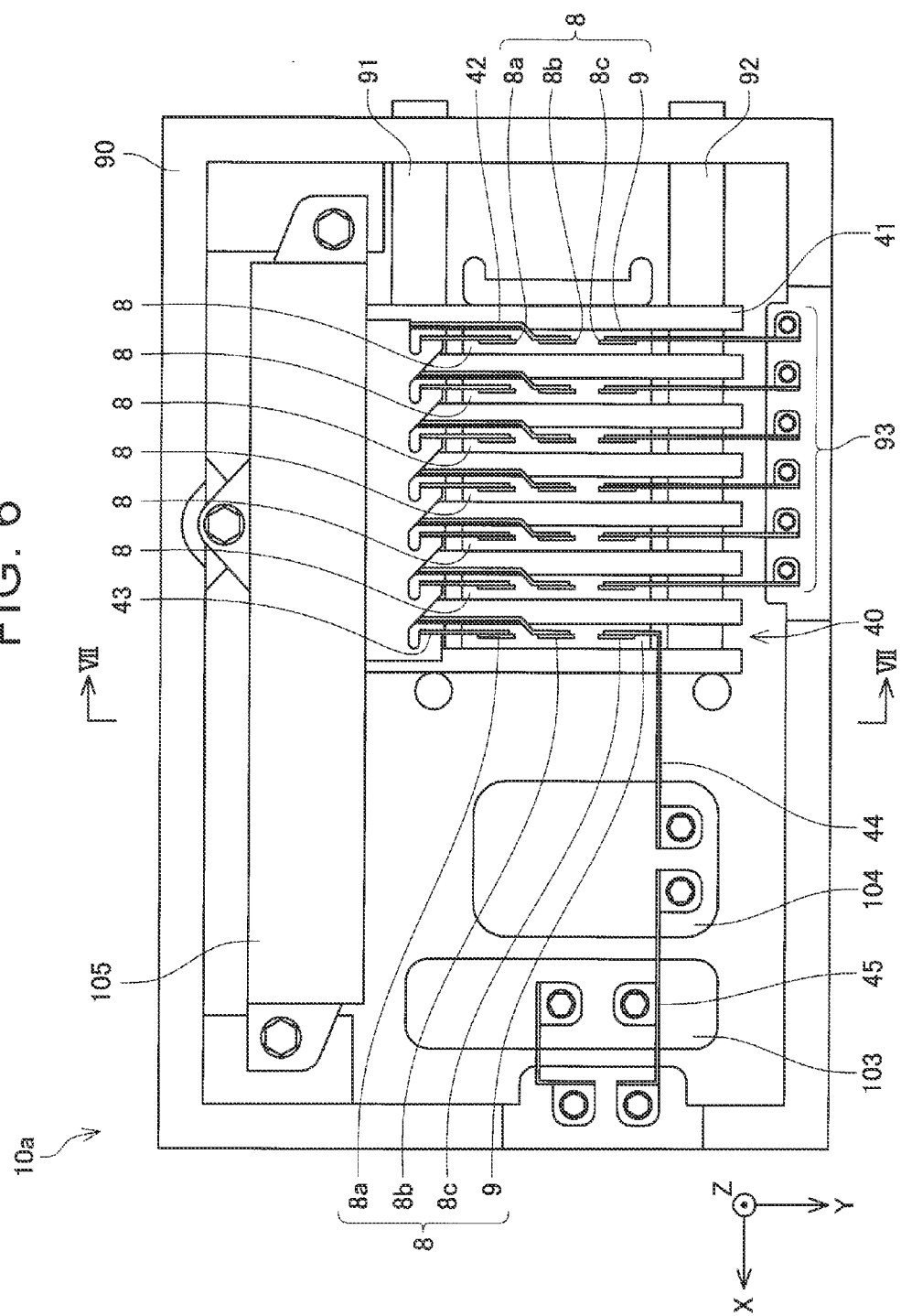
FIG. 6 is a plan view of the electric power conversion device of the second example.
Figure 7:
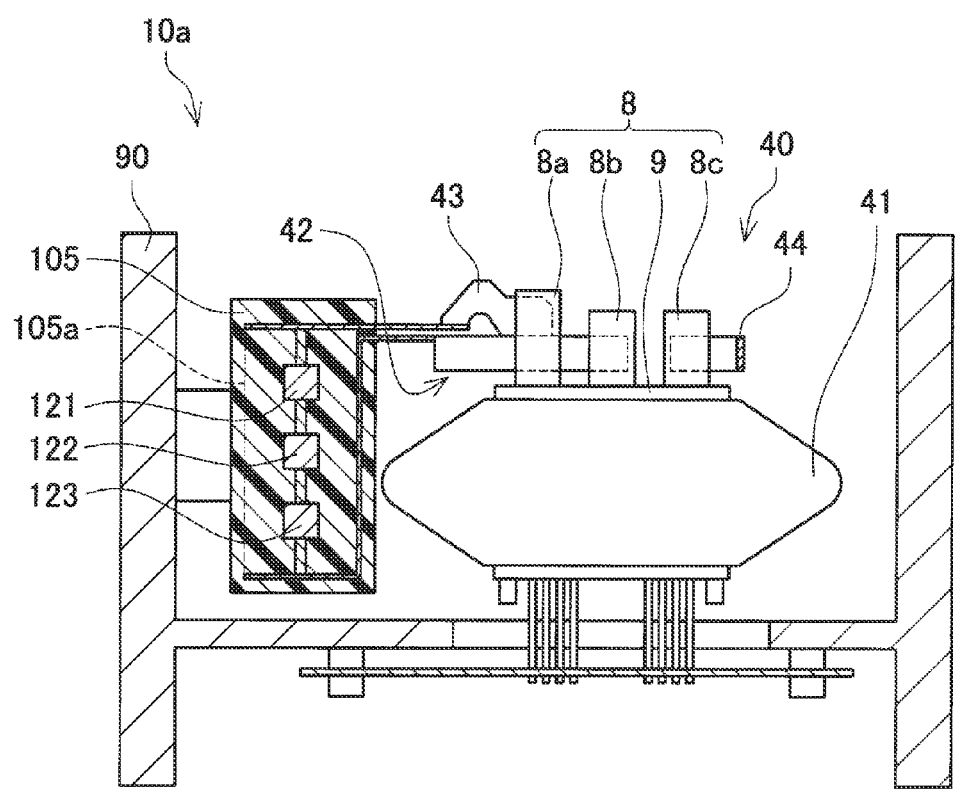
FIG. 7 is a sectional view along the line VII-VII of FIG. 6.

FIG. 6 is a plan view of hardware of the electric power conversion device 10a, and FIG. 7 is a sectional view taken along the line VII-VII of FIG. 6. In the electric power conversion device 10a, a laminate unit 40 in which a plurality of power card 8 and a plurality of cooling plates 41 are laminated, a reactor unit 104, a first capacitor unit 103, and a second capacitor unit 105 are accommodated in a case 90.

In the laminate unit 40, the power cards 8 and the cooling plates 41 are alternately laminated one by one. A refrigerant supply pipe 91 and a refrigerant discharge pipe 92 pass through the cooling plates 41. One end of the refrigerant supply pipe 91 and the refrigerant discharge pipe 92 extend outside the case 90 and is connected to a refrigerant circulation device (not shown). A refrigerant is distributed to all cooling plates 41 through the refrigerant supply pipe 91 and cools the power cards 8 adjacent to each cooling plate 41. The refrigerant passing through the cooling plate 41 is returned to the refrigerant circulation device (not shown) through the refrigerant discharge pipe 92.

In each power card 8, two transistors connected in series and a reflux diode connected in reversely parallel with each transistor are accommodated in a resin main body 9. In the electric power conversion device 10a, one set of series connection of the two transistors 16a, 16b is included in the bidirectional DC-DC converter 31, and three sets of series connections of the two transistors 4 are included in each of the inverters 32a, 32b. Each series connection corresponds to one power card 8. That is, the electric power conversion device 10a is provided with seven sets of series connections, that is, seven power cards 8. A positive electrode terminal 8a corresponding to a high potential-side terminal of the series connection of the transistors, a negative electrode terminal 8b corresponding to a low potential-side terminal, and a midpoint terminal 8c corresponding to the midpoint extend from the main body 9 of each power card 8. The positive electrode terminals 8a and the negative electrode terminals 8b of all power cards 8 are connected to the second capacitor unit 105 by a positive electrode bus bar 43 and a negative electrode bus bar 42, respectively. The positive electrode bus bar 43 corresponds to the electric power positive electrode line 13a of FIG. 5, and the negative electrode bus bar 42 corresponds to the electric power negative electrode line 13b of FIG. 5.

A capacitor element 105a corresponding to the smoothing capacitor 19 of FIG. 5, a capacitor element 122 corresponding to the snubber capacitor 22 of the snubber circuit 20 of FIG. 5, a resistor element 121 corresponding to the resistor 21 of FIG. 5, and a coil element 123 corresponding to the coil 23 of FIG. 5 are embedded in the second capacitor unit 105 (see FIG. 7). The capacitor element 105a is connected between the positive electrode bus bar 43 and the negative electrode bus bar 42 inside the second capacitor unit 105. The resistor element 121, the capacitor element 122, and the coil element 123 are connected in series inside the second capacitor unit 105, and the series connection (snubber circuit 20) is connected between the positive electrode bus bar 43 and the negative electrode bus bar 42. That is, the snubber circuit 20 is accommodated in the second capacitor unit 105 which accommodates the smoothing capacitor 19. Then, the snubber circuit 20 (the capacitor element 122, the resistor element 121, and the coil element 123) is connected in parallel with the smoothing capacitor 19 (capacitor element 105a) inside the second capacitor unit 105. The snubber circuit 20 is accommodated in the second capacitor unit 105, whereby it is possible to reduce the size of the electric power conversion device 10a compared to a case where an independent space for the snubber circuit 20 is secured.

The midpoint terminals 8c of the six power cards (other power cards 8 excluding the power cards at the left end of FIG. 6) constituting the two inverters 32a, 32b are connected to a connection terminal 93 to the outside through another bus bar. The power cards (the power cards 8 at the left end of FIG. 6) including the series connection of the transistors included in the bidirectional DC-DC converter 31 are connected to the reactor unit 104 through the bus bar 44. The reactor unit 104 and the first capacitor unit 103 are connected to each other through another bus bar 45. A reactor element corresponding to the reactor 15 of FIG. 5 is accommodated in the reactor unit 104 shown in FIG. 6, and a capacitor element corresponding to the filter capacitor 14 of FIG. 5 is accommodated in the first capacitor unit 103.

Points to note about the technique described in the examples will be described. The smoothing capacitor 19 is a capacitor which suppresses ripples of several [kHz] to several tens of [kHz], and the capacitance thereof is substantially set in a range of several tens of [μF] to several hundreds of [μF]. The capacitance of the snubber capacitor 22 which is inserted in order to suppress ringing in a range of several [MHz] to several tens of [MHz] is substantially set in a range of several hundreds of [pF] to several [nF]. The capacitance Cs of the snubber capacitor 22 is equal to or less than one thousandth of the capacitance Cm of the smoothing capacitor 19 for suppressing ripples. Since there is such a difference, in a case of determining the capacitance of the snubber capacitor 22, the capacitance of the smoothing capacitor 19 is negligible.

The transistors 16, 16a, 16b, and 4 of the examples correspond to an example of a "transistor for electric power conversion" of SUMMARY. The coil 23 of the examples corresponds to an example of an "inductor element" of SUMMARY. The loop indicated by reference numeral A of FIG. 1 corresponds to an example of a "first loop" of SUMMARY, and the loop indicated by reference numeral A2 of FIG. 1 corresponds to an example of a "second loop" of SUMMARY. In FIG. 5, the loop constituted of the snubber circuit 20 and the smoothing capacitor 19 corresponds to another example of the "first loop" of SUMMARY, and the loop constituted of each transistor and the smoothing capacitor 19 corresponds to another example of the "second loop" of SUMMARY.

While specific examples of the disclosure have been described in detail, these examples are for illustrative purposes and are not intended to limit the disclosure. The disclosure includes various modifications and alterations of the specific examples illustrated above. The technical elements described in this specification or the drawings exert technical utility independently or in combination of some of them, and the combination is not limited to one described in the claims as filed. The technology illustrated in this specification or the drawings achieves a plurality of objects at the same time, and has technical utility by achieving one of these objects.

What is claimed is:

1. An electric power conversion device comprising:
   a transistor for electric power conversion;
   a diode connected in series with the transistor;
   a smoothing capacitor connected in parallel with the transistor and the diode, the smoothing capacitor being configured to suppress ripples generated by the transistor; and a snubber circuit including a snubber capacitor, an inductor element and a resistor, the snubber capacitor, the inductor element and the resistor being connected to each other in series, the snubber circuit being connected in parallel with the smoothing capacitor, wherein capacitance of the snubber capacitor, inductance of the inductor element and magnitude of the resistor are set such that a resonance frequency of the snubber circuit coincides with a ringing frequency of the transistor, and impedance of a first loop at the resonance frequency becomes smaller than impedance of a second loop at the resonance frequency;

the first loop includes the snubber circuit and the smoothing capacitor, and the second loop includes the transistor and the smoothing capacitor;

the capacitance of the snubber capacitor is set to be equal to inter-terminal capacitance of the transistor;

the inductance of the inductor element is set such that the inductance of the first loop becomes equal to the inductance of the second loop; and the magnitude of the resistor is set such that the impedance of the first loop at the resonance frequency becomes smaller than the impedance of the second loop at the resonance frequency.

2. The electric power conversion device according to claim 1, wherein the snubber circuit is accommodated in a capacitor unit, and the capacitor unit accommodates the smoothing capacitor.

3. An electric power conversion device comprising:

a power conversion transistor;

a smoothing capacitor connected in parallel with the power conversion transistor to suppress ripples generated by the power conversion transistor; and a snubber circuit that is connected in parallel with the power conversion transistor and the smoothing capacitor, and includes a snubber capacitor, an inductor and a resistor that are connected to each other in series, wherein:

the power conversion transistor and the smoothing capacitor form a first current loop;

the snubber capacitor, the inductor and the resistor of the snubber circuit and the smoothing capacitor form a second current loop through which current flows in a direction opposite to a current flow of the first current loop, resistance of the resistor of the snubber circuit is set such that impedance of the second loop is lower than impedance of the first loop at a resonance frequency of the snubber circuit, capacitance of the snubber capacitor is set to be equal to parasitic capacitance of the transistor, and inductance of the inductor of the snubber circuit is set such that inductance of the first loop is equal to inductance of the second loop.

* * * * *